United States Patent
Bae et al.

(10) Patent No.: US 9,847,617 B2
(45) Date of Patent: Dec. 19, 2017

(54) NANOSECOND TI:SAPPHIRE LASER (71) Applicant: UNIST(ULSAN NATIONAL INSTITUTE OF SCIENCE AND TECHNOLOGY), Ulsan (KR)

(72) Inventors: Sung Chul Bae, Ulsan (KR); Timothy Kwan Mo Yang, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 15/248,000

(22) Filed: Aug. 26, 2016

(65) Prior Publication Data
US 2017/0063021 A1    Mar. 2, 2017

(30) Foreign Application Priority Data

Sep. 1, 2015    (KR) .......................... 10-2015-0123842

(51) Int. Cl.
| | |
|---|---|
| *H01S 3/106* | (2006.01) |
| *H01S 3/081* | (2006.01) |
| *H01S 3/16* | (2006.01) |
| *H01S 3/08* | (2006.01) |
| *H01S 3/094* | (2006.01) |
| *H01S 3/00* | (2006.01) |

(52) U.S. Cl.
CPC .......... *H01S 3/1068* (2013.01); *H01S 3/0811* (2013.01); *H01S 3/0085* (2013.01); *H01S 3/0805* (2013.01); *H01S 3/0813* (2013.01); *H01S 3/0817* (2013.01); *H01S 3/08031* (2013.01); *H01S 3/094038* (2013.01); *H01S 3/1625* (2013.01); *H01S 3/1636* (2013.01)

(58) Field of Classification Search
CPC .. H01S 3/1068; H01S 3/0811; H01S 3/08031; H01S 3/0805; H01S 3/0817; H01S 3/094038; H01S 3/0085; H01S 3/0813; H01S 3/1625
See application file for complete search history.

(56) References Cited

U.S. PATENT DOCUMENTS

2015/0162721 A1*  6/2015  Bowman ............... H01S 3/1606
                                                    356/5.01

FOREIGN PATENT DOCUMENTS

KR    10-0451115    12/2004

OTHER PUBLICATIONS

Timothy K. Yang et al, "High Repetition Nanosecond Ti:Sapphire Laser for Photoacoustic Microscopy Applications", SPIE. Photonics West Bios Expo(2015 Technical Summaries), Feb. 2015, Part of Proceedings of SPIE vol. 9323 Photons Plus Ultrasound: Imaging and Sensing 2015.

* cited by examiner

*Primary Examiner* — Dung Nguyen
(74) *Attorney, Agent, or Firm* — Lex IP Meister, PLLC (57) ABSTRACT

A laser according to an exemplary embodiment of the present invention includes a pump laser outputting laser light, and a laser resonator including a laser crystal and an acoustic optical modulator and resonating the laser light output from the pump laser, wherein the pump laser is a Nd:YAG, and the laser crystal is Ti:Sapphire.

2 Claims, 7 Drawing Sheets

FIG. 7 ns to 15 ns, a wavelength of 650 nm to 1180 nm, repeatability of 100 kHz to 1 MHz, and energy per pulse of 30 nJ to 50 nJ.
NANOSECOND TI:SAPPHIRE LASER

CROSS-REFERENCE TO RELATED APPLICATION

This application claims priority to and the benefit of Korean Patent Application No. 10-2015-0123842 filed in the Korean Intellectual Property Office on Sep. 1, 2015, the entire contents of which are incorporated herein by reference.

BACKGROUND OF THE INVENTION (a) Field of the Invention

The present invention relates to a nanosecond Ti:Sapphire laser. In detail, the present invention relates to a nanosecond Ti:Sapphire laser with high repetition for photoacoustic microscopy.

(b) Description of the Related Art

High resolution optical microscopy such as optical coherence tomography (OCT) microscopy and multiphoton microscopy (MPM) helps to obtain an in vivo image without a surgical procedure. However, because light scattering in tissue is high, a deep image is not obtained. Photoacoustic microscopy (PAM) has high resolution and contrast while overcoming these drawbacks. In the past, photoacoustic microscopy has mainly used a Nd:YAG 532 nm laser. In order to use a wavelength other than the 532 nm wavelength, an optical parametric oscillator (OPO) must be used. However, the optical parametric oscillator has a major drawback in that usage is cumbersome and a volume thereof is large.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a nanosecond Ti:Sapphire laser.

A laser according to an exemplary embodiment of the present invention includes: a pump laser outputting laser light; and a laser resonator including a laser crystal and an acoustic optical modulator and resonating the laser light output from the pump laser. The pump laser is a Nd:YAG, and the laser crystal is Ti:Sapphire.

The laser resonator may include a first concave mirror, the laser crystal, a second concave mirror, a first prism, a second prism, an end mirror, a third concave mirror, the acoustic optical modulator, an output coupler, and a fourth concave mirror.

The laser crystal may be installed between the first concave mirror and the second concave mirror and between the second concave mirror and the third concave mirror, the first prism and the second prism may be installed between the second concave mirror and the end mirror, and the acoustic optical modulator may be installed between the third concave mirror and the fourth concave mirror and between the third concave mirror and the output coupler.

The laser may irradiate laser light having a pulse length of 5 ns to 15 ns, a wavelength of 650 nm to 1180 nm, repeatability of 100 kHz to 1 MHz, and energy per pulse of 30 nJ to 50 nJ.

The laser according to an exemplary embodiment of the present invention, without an optical parametric oscillator, may control the wavelength with a range of 660 nm to 1180 nm.

This wavelength range is included in a wavelength having less scattering in biological samples such that it is suitable for imaging a deep area.

The laser according to an exemplary embodiment of the present invention may perform imaging with high repeatability such that there is a merit that a high contrast-to-noise ratio (CNR) may be obtained through averaging.

DETAILED DESCRIPTION OF THE EMBODIMENTS

Terms used throughout the specification, such as 'first', 'second', 'third', etc., can be used to describe various portions, components, regions, layers, and/or sections, but are not limited thereto. These terms are used only to differentiate any portion, component, region, layer, or section from other portions, components, regions, layers, or sections. Therefore, a first portion, component, region, layer, section, and the like which are described below may be mentioned as a second portion, component, region, layer, section and the like within a range without deviating from the scope of the present invention.

The terminologies used hereafter are only for describing specific exemplary embodiments and are not intended to limit the present invention. Singular terms used herein include plural terms unless phrases clearly express opposite meanings. The term 'including' used herein embodies concrete specific characteristics, regions, positive numbers, steps, operations, elements, and/or components, without limiting existence or addition of other specific characteristics, regions, positive numbers, steps, operations, elements, and/or components.

If not defined differently, all terminologies including technical terminologies and scientific terminologies used herein have meanings that are the same as ones that those skilled in the art generally understand. Terms defined in dictionaries should be construed as having meanings corresponding to the related prior art documents and those stated herein, and are not to be construed as being idealized or official, if not so defined.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
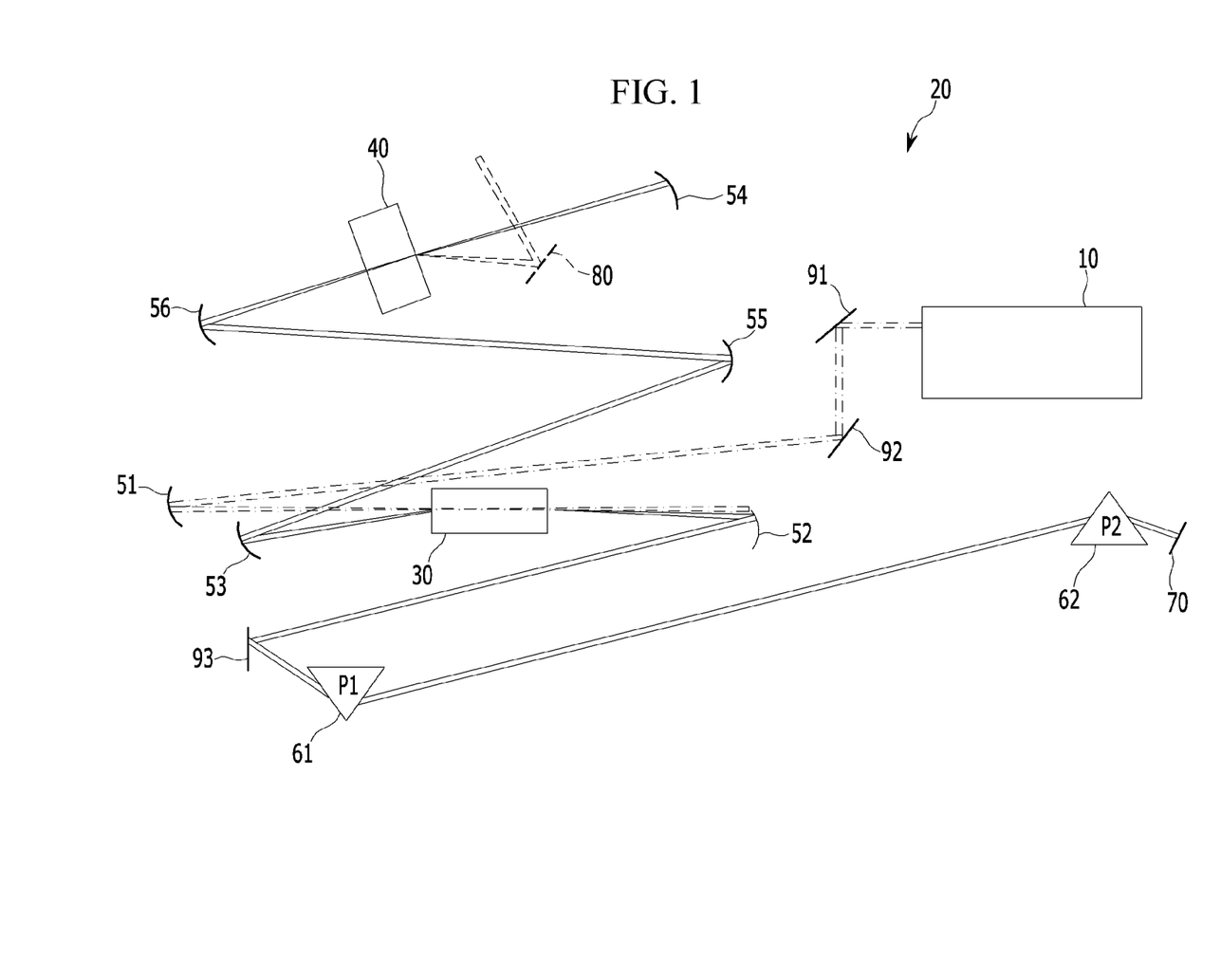
FIG. 1 is a schematic view of a laser according to an exemplary embodiment of the present invention.

FIG. 1 is a schematic view of a laser according to an exemplary embodiment of the present invention. The laser of FIG. 1 is only for illustrating the present invention, and the present invention is not limited thereto. Accordingly, the laser may be variously changed.

As shown in FIG. 1, the laser according to an exemplary embodiment of the present invention includes a pump laser 10 for outputting laser light, a laser crystal 30, and an acoustic optical modulator 40, and further includes a laser resonator 20 resonating the laser light outputted from the pump laser 10. In this case, the pump laser 10 is a Nd:YAG, and the laser crystal 30 is a Ti:Sapphire.

The pump laser 10 serves to excite the Ti:Sapphire crystal to generate fluorescence, and a Nd:YAG is used as the pump laser 10. The pump laser 10 has a 532 nm wavelength, and wavelengths included within 650 to 1180 nm are output from the Ti:Sapphire crystal as fluorescence.

The laser light output from the pump laser 10 is incident to the laser resonator 20. As illustrated in FIG. 1, the laser light outputted from the pump laser 10 is incident to the laser resonator 20 by changing a light path through a first mirror 91 and a second mirror 92.

The laser resonator 20 includes the laser crystal 30 and the acoustic optical modulator 40, and resonates the laser light output from the pump laser 10.

The laser crystal 30 has a function of a gain medium (an energy accumulation material to produce the laser). As the fluorescence emitted from the crystal continuously passes through the crystal, a phenomenon in which the energy in the resonator 20 is amplified is generated. In an exemplary embodiment of the present invention, the Ti:Sapphire crystal is used as the laser crystal 30. In detail, as the laser crystal 30, the Ti:Sapphire crystal truncated to a Brewster's angle of 6 to 10 mm may be used.

The acoustic optical modulator 40 may use a general acoustic optical modulator, and in an exemplary embodiment of the present invention, by controlling a wireless frequency of the acoustic optical modulator 40, a pulse length of the laser light may be controlled to 5 ns to 15 ns, and repeatability may be controlled to 100 kHz to 1 MHz. When the acoustic optical modulator 40 is operated, the laser may be output outside the resonator 20 by diffracting the energy accumulated in the resonator 20. Also, when the acoustic optical modulator 40 is not operated, the accumulated energy is not diffracted such that the energy is further accumulated while the laser light is returned to the way back.

For example, by using a delay generator and a DAQ positioned outside the laser, a pulse length of the laser light may be controlled to 5 ns to 15 ns and the repeatability to 100 kHz to 1 MHz.

In detail, the laser resonator 20 may include the laser crystal 30, a first concave mirror 51, a second concave mirror 52, a first prism 61, a second prism 62, an end mirror 70, a third concave mirror 53, an acoustic optical modulator 40, an output coupler 80, a fourth concave mirror 54, a fifth concave mirror 55, and a sixth concave mirror 56.

The first concave mirror 51 to the fourth concave mirror 54, the end mirror 70, and the output coupler 80 may use a generally-used mirror in the laser and serve to appropriately control the light path direction of the laser light in the laser resonator 20 through the diffraction.

The first prism 61 and second prism 62 may use a dispersion correction prism generally-used in the laser and serves to disperse the fluorescence of 650 nm to 1180 nm emitted from the Ti:Sapphire.

In detail, the laser crystal 30 may be installed between the first concave mirror 51 and the second concave mirror 52 and between the second concave mirror 52 and the third concave mirror 53, the first prism 61 and the second prism 62 may be installed between the second concave mirror 52 and the end mirror 70, and the acoustic optical modulator 40 may be installed between the third concave mirror 53 and the fourth concave mirror 54, and between the third concave mirror 53 and the output coupler 80. To control the light path, a first mirror 91 and a second mirror 92 may be further installed between the pump laser 10 and the first concave mirror 51. A third mirror 93 may be further installed between the second concave mirror 52 and the first prism 61

Also, a fifth concave mirror 55 and a sixth concave mirror 56 may be further installed between the acoustic optical modulator 40 and the third concave mirror 53.

If the operation principle of the laser resonator 20 is described in detail, the laser light output from the pump laser 10 is reflected to the first concave mirror 51 to be incident to the laser crystal 30. The fluorescence of the Ti:Sapphire is generated by the laser light incident to the laser crystal 30 from the first concave mirror 51. Because the fluorescence emitted from the laser crystal 30 is spread, to again concentrate the fluorescence, the light is gathered in the second concave mirror 52 and the second prism 62 again gathers the light spread for each wavelength while passing through the first prism 61 and reflects it from the end mirror 70, and simultaneously the fluorescence emitted from the Ti:Sapphire is reflected from the third concave mirror 53 to the fifth concave mirror 55, reaches the fourth concave mirror 54 through the acoustic optical modulator 40, and is again reflected back to the laser crystal 30. The fluorescence of a root passing through the upper acoustic optical modulator 40 and the fluorescence of the root passing through the lower prisms 61 and 62 again pass through the laser crystal 30 and the energy is amplified. That is, the fluorescence reciprocates between the fourth concave mirror 54 and the end mirror 70 and is continuously amplified. When passing through the first prism 61, the fluorescence is spread for each wavelength, and before the spread fluorescence is incident to the second prism 62, the rest of the wavelength except for a predetermined wavelength is blocked by a slit before the second prism 62. Accordingly, only the desired predetermined wavelength is amplified between the fourth concave mirror 54 and the end mirror 70.

In this way, the laser light having the pulse length of 5 ns to 15 ns, the wavelength of 650 nm to 1180 nm, the repeatability of 100 kHz to 1 MHz, and the energy per pulse of 30 nJ to 50 nJ may be obtained through the laser according to an exemplary embodiment of the present invention. Particularly, the laser light having the wavelength of 700 nm to 900 nm is used in an angiogenesis and a melanoma analysis, thereby being an important wavelength band.

A following exemplary embodiment of the present invention and a comparison are illustrated in more detail. However, the following exemplary embodiment is only an example of the present invention, and the present invention is not limited thereto.

Exemplary Embodiment

A Nd:YAG (Opus, MPC6000) is used as the pump laser 10, the Ti:Sapphire crystal having the Brewster angle of 8 mm is used as the laser crystal 30, and the acoustic optical modulator 40 uses R31389.5-10AS of NeosTech company.

Figure 2:
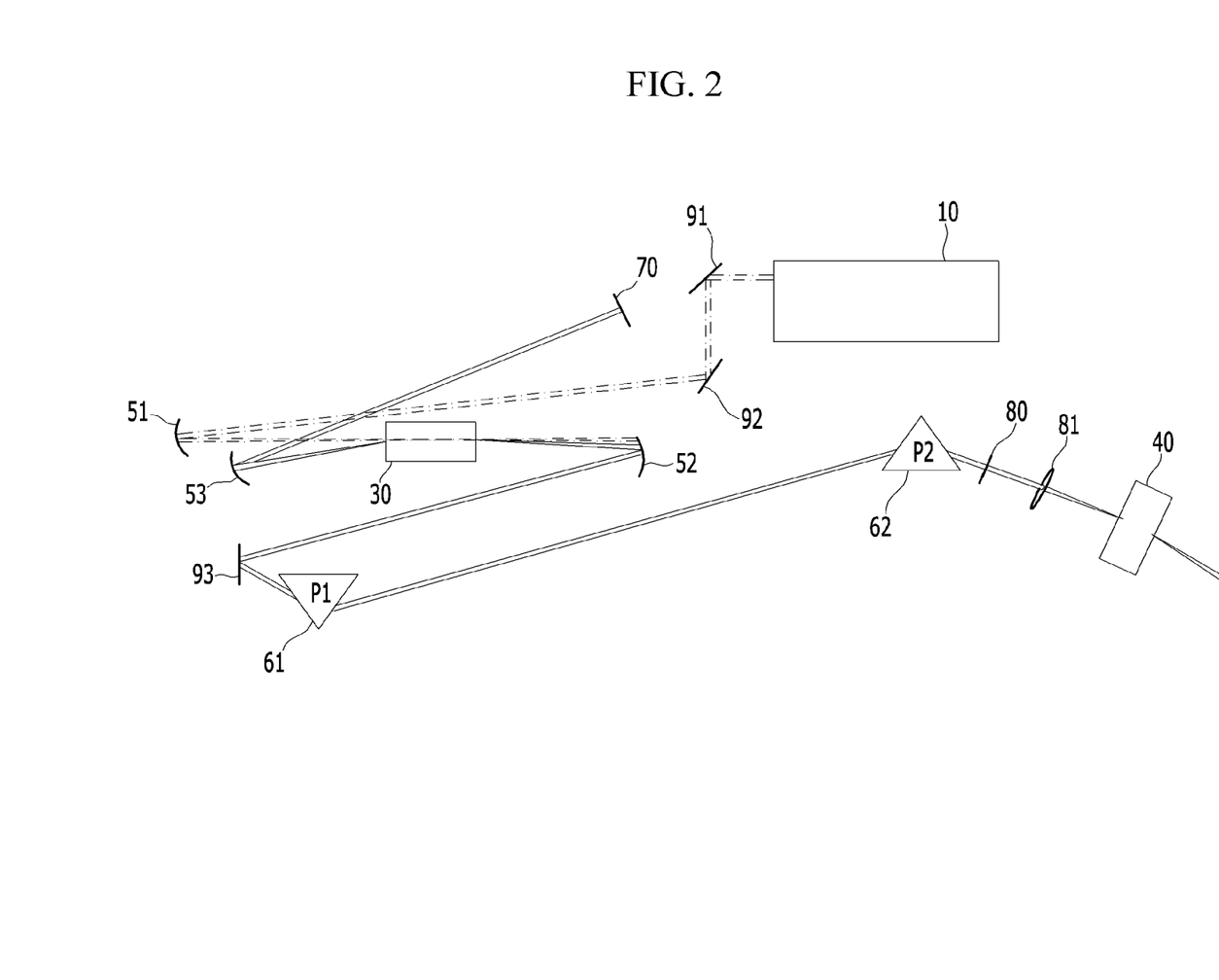
FIG. 2 is a schematic view of a partial variation of a laser in an exemplary embodiment to measure a specification of laser light.
Figure 3:
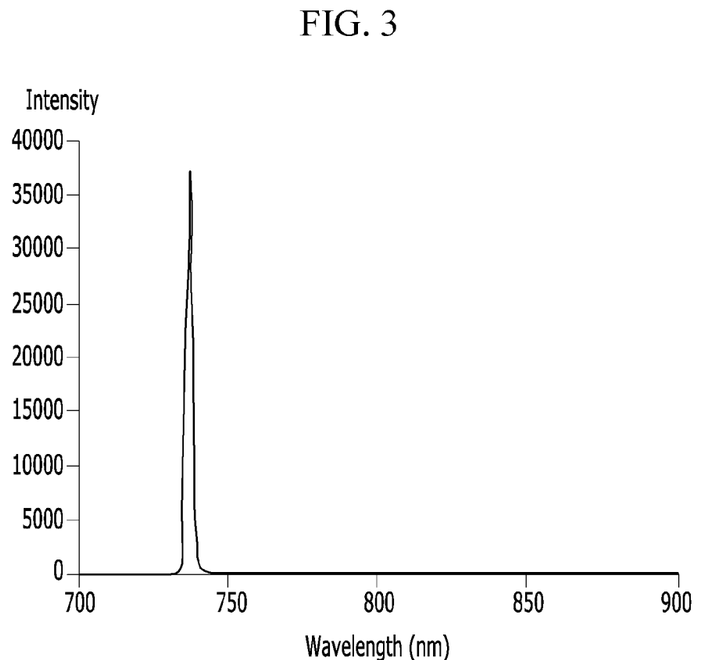
FIG. 3 is a graph measuring intensity by controlling a wavelength of laser light to 735 nm.
Figure 4:
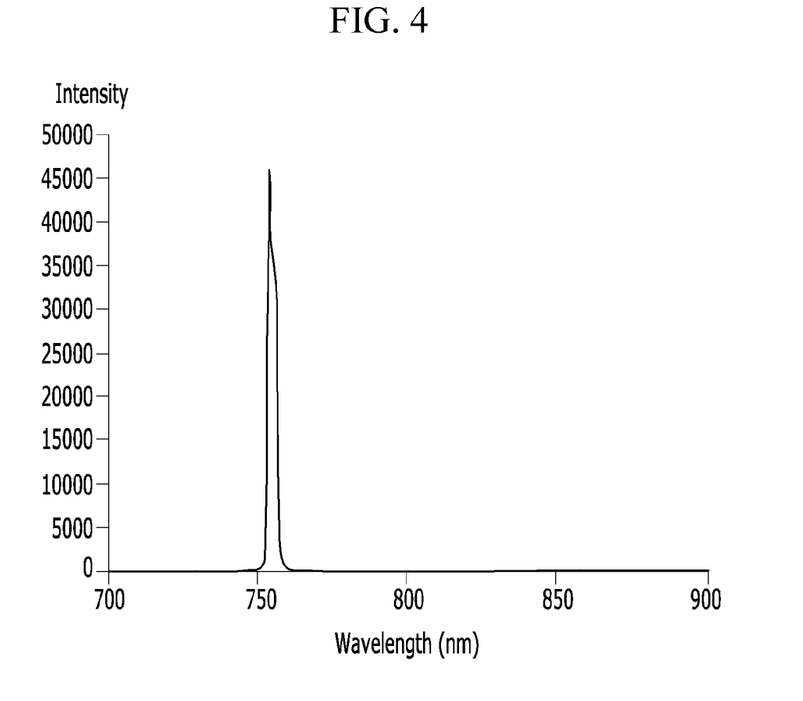
FIG. 4 is a graph measuring intensity by controlling a wavelength of laser light to 760 nm.
Figure 5:
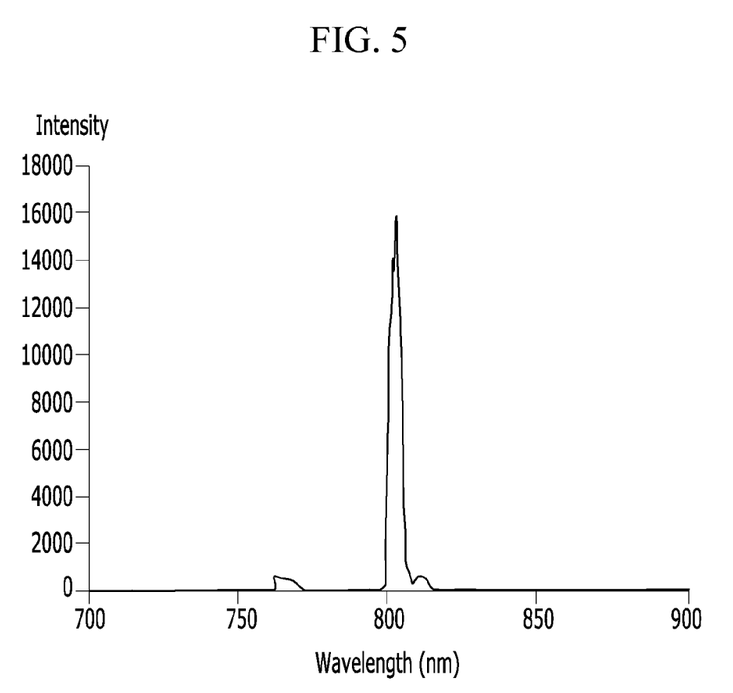
FIG. 5 is a graph measuring intensity by controlling a wavelength of laser light to 805 nm.
Figure 6:
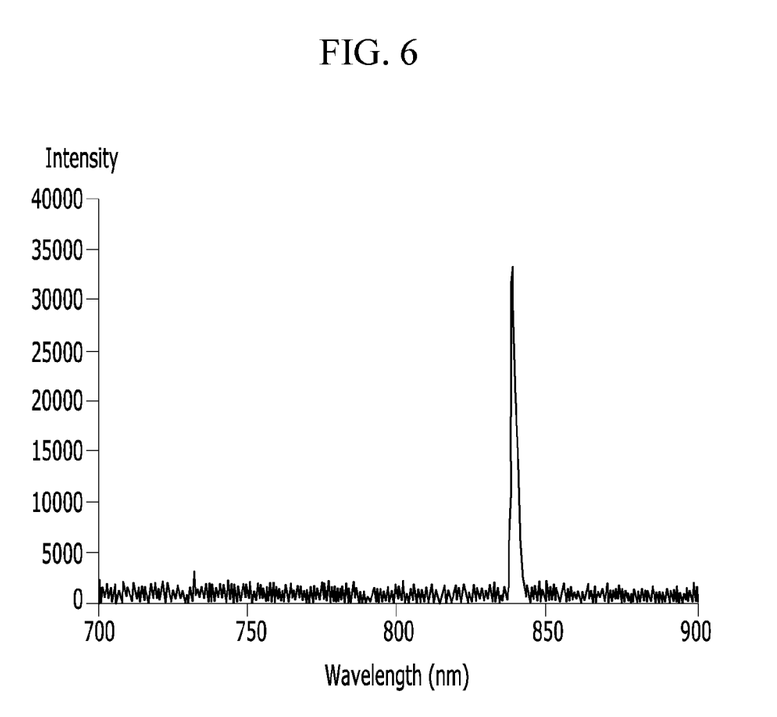
FIG. 6 is a graph measuring intensity by controlling a wavelength of laser light to 840 nm.

As an exemplary embodiment of the present invention, like FIG. 1, when the acoustic optical modulator 40 is installed in the laser resonator 20, because it is difficult to measure the specifications of the laser light irradiated from the laser, like FIG. 2, the acoustic optical modulator 40 is installed outside the output coupler 80.

When the acoustic optical modulator 40 is installed outside the laser resonator 20, only the energy per pulse of the laser light is changed, and the rest of the specifications of the pulse length, the wavelength, and the repeatability are not changed and the energy per pulse may be predicted through a simple calculation, and in the case of the exemplary embodiment, the output coupler is 95% such that the prediction is possible by multiplying 20 times the energy per pulse.

If the arrangement of FIG. 2 is simply described, the photoacoustic modulator is not used in the laser resonator 20. The laser of which the energy is reduced by 95% and the energy of the laser diffracted through the photoacoustic modulator is measured through this laser.

For the wavelength dispersed from the first prism 61, while moving the slit positioned before the second prism 62, the intensity at 735 nm, 760 nm, 805 nm, and 840 nm is measured and is shown in FIG. 3 to FIG. 6, respectively.

Figure 7:
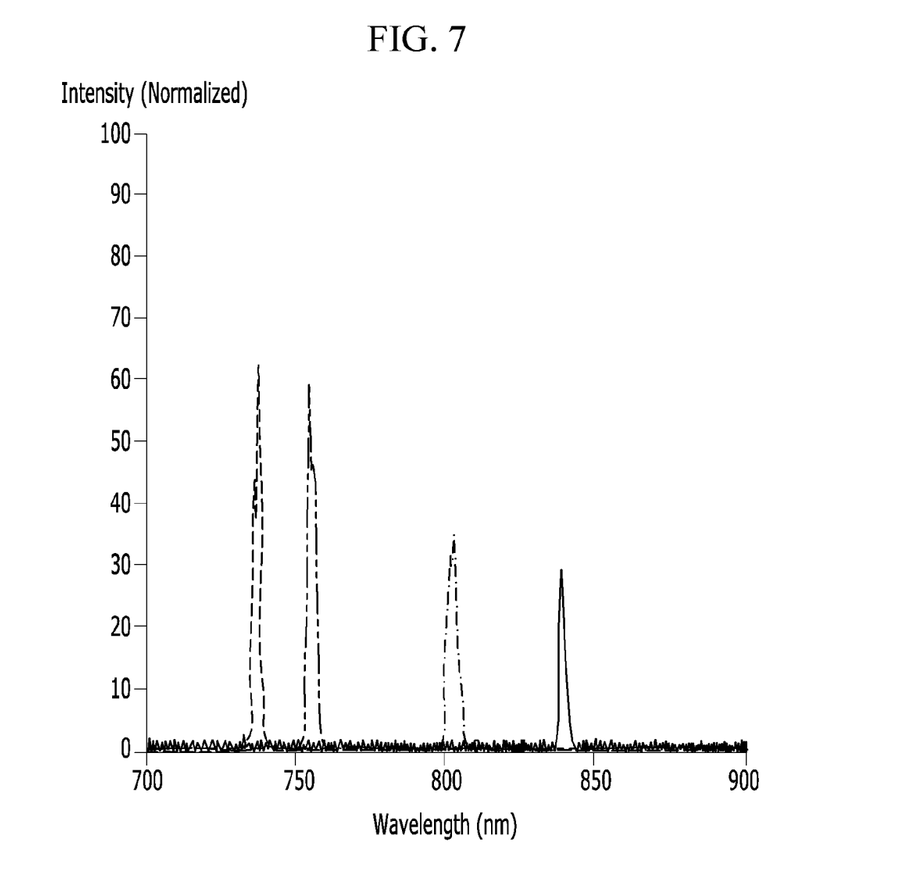
FIG. 7 is a graph showing a change of a wavelength.

FIG. 7 is a view in which the wavelengths shown in FIG. 3 to FIG. 6 are summed to be easily represented.

As a result of analyzing the specifications of the laser light irradiated by the laser of FIG. 2, energy of 2.2 nJ per pulse is measured in a state in which the repeatability is 1 MHz. It is analyzed that the energy per pulse is about 40 nJ, the pulse length is 10 ns, and the wavelength is 720 nm to 850 nm. By using the larger prism, the wider wavelength region may be obtained.

As shown in FIG. 1, when the acoustic optical modulator 40 is installed in the laser resonator 20, the energy per pulse is increased by 20 times such that the energy per pulse may be predicted as about 40 nJ, and the repeatability of the laser light, the pulse length, and the wavelength as the rest of the specifications are the same.

The exemplary embodiments and modified examples of the present invention have been described and shown with reference to the accompanying drawings, but the present invention is not limited to the exemplary embodiments and may be manufactured in various forms. As described above, it will be appreciated by those skilled in the art that changes may be made in these embodiments without departing from the principles and spirit of the general inventive concept, the scope of which is defined in the appended claims and their equivalents. Therefore, it should be understood that the exemplary embodiments described above are not limitative but are exemplary in all the aspects.

<Description of Symbols>

| 10: pump laser | 20: laser resonator |
| --- | --- |
| 30: laser crystal | 40: acoustic optical modulator |
| 51: first concave mirror | 52: second concave mirror |
| 53: third concave mirror | 54: fourth concave mirror |
| 55: fifth concave mirror | 56: sixth concave mirror |
| 61: first prism | 62: second prism |
| 70: end mirror | 80: output coupler |
| 81: lens | 91: first mirror |
| 92: second mirror | 93: third mirror |

What is claimed is:

1. A laser comprising:
   a pump laser outputting laser light; and
   a laser resonator including a first concave mirror, a laser crystal, a second concave mirror, a first prism, a second prism, an end mirror, a third concave mirror, an acoustic optical modulator, an output coupler, and a fourth concave mirror,
   wherein the laser crystal is installed between the first concave mirror and the second concave mirror, and between the second concave mirror and the third concave mirror,
   the first prism and the second prism are installed between the second concave mirror and the end mirror,
   the acoustic optical modulator is installed between the third concave mirror and the fourth concave mirror, and between the third concave mirror and the output coupler, and
   the pump laser is a Nd:YAG, and the laser crystal is Ti:Sapphire.

2. The laser of claim 1, wherein
   the laser irradiates the laser light having a pulse length of 5 ns to 15 ns, a wavelength of 650 nm to 1180 nm, repeatability of 100 kHz to 1 MHz, and energy per pulse of 30 nJ to 50 nJ.

* * * * *